United States Patent [19]
Luyckx

[11] Patent Number: 6,093,129
[45] Date of Patent: Jul. 25, 2000

[54] REVERSE GEARING

[75] Inventor: Johan Louis Luyckx, Bilzen, Belgium

[73] Assignee: Crown Gear Holding B.V., Netherlands

[21] Appl. No.: 09/223,667

[22] Filed: Dec. 30, 1998

Related U.S. Application Data

[63] Continuation of application No. PCT/NL97/00372, Jul. 1, 1997.

[30] Foreign Application Priority Data

Jul. 5, 1996 [NL] Netherlands ............................ 1003523

[51] Int. Cl.⁷ ...................................................... F16H 3/60
[52] U.S. Cl. .............................................................. 475/273
[58] Field of Search ..................................... 475/273, 306, 475/308, 309

[56] References Cited

U.S. PATENT DOCUMENTS 2,313,183  3/1943  Trbojevich ............................... 475/273
2,763,165  9/1956  Baschet .................................... 475/273
3,685,371  8/1972  Crooks.

FOREIGN PATENT DOCUMENTS 556903    8/1993  European Pat. Off. .
136468    1/1920  United Kingdom .
90 08271  7/1990  WIPO .

Primary Examiner—Dirk Wright

[57] ABSTRACT

In a reverse clutch, which is switchable by means of couplings, the input shaft and the output shaft lie in line with each other. A compact reverse clutch which is easy to assemble can be obtained by making use of face gears which are mounted on the input and output shaft. The cylindrical pinions placed between the face gears and in mesh therewith are mounted in an intermediate ring. A coupling can connect the intermediate ring to the housing. Another coupling can connect the input and the output shaft to each other directly or indirectly by way of the toothing.

7 Claims, 4 Drawing Sheets

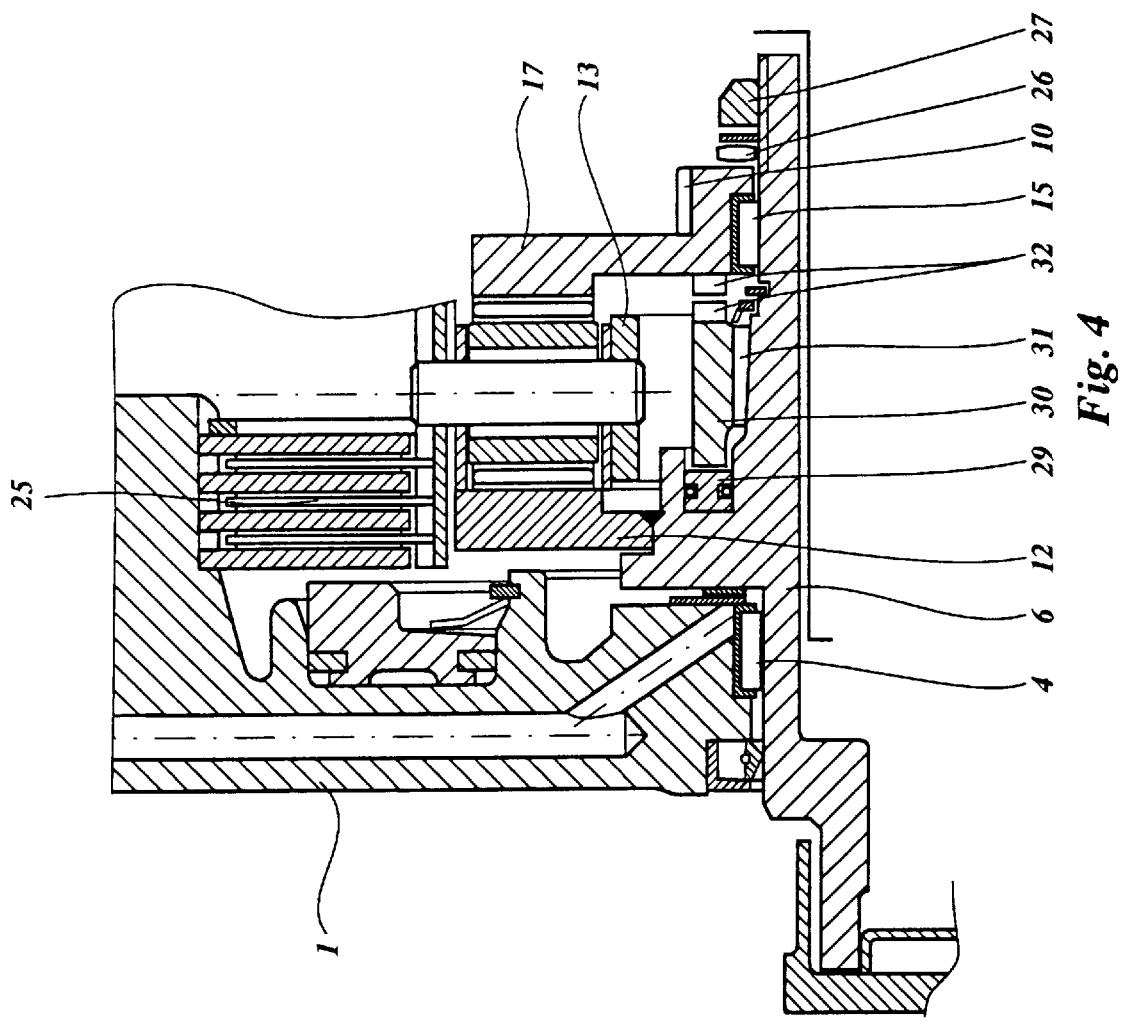

REVERSE GEARING

CROSS-REFERENCE TO RELATED APPLICATIONS

This is a continuing application of PCT/NL97/00372 filed Jul. 1, 1997.

BACKGROUND OF THE INVENTION

The invention relates to a reverse clutch comprising an input shaft, an output shaft and an intermediate ring which are rotatable about a common axis of rotation in a housing and relative to each other, and further comprising a first gearwheel rotatably coupled to the input shaft, a second gearwheel rotatably coupled to the output shaft, a first coupling for rotatably coupling the input and the output shaft, a second coupling for rotatably coupling the intermediate ring and the housing and cylindrical pinions which are in mounted in the intermediate ring between and in mesh with the first and the second gearwheel.

A reverse clutch of this type is known from, for example, U.S. Pat. No. 3,685,371, which discloses a reverse clutch which is used in motor cars.

The disadvantage of the known reverse clutch is that, when reversing the direction of rotation, the rotational speed is changed as the diameters of the first gearwheel and the second gearwheel differ.

SUMMARY OF THE INVENTION

The object of the invention is to eliminate the above mentioned disadvantage.

This object is achieved with a reverse clutch of the abovementioned type wherein the axis of rotation of the cylindrical pinions is substantially perpendicular to the common axis of rotation. In this clutch the diameters of the first gear and the second gearwheel can be substantially equal so that the rotational speed does not significantly change when the direction of rotation is reversed.

According to a further improvement of the reverse clutch according to the invention, the housing is slideable in axial direction relative to the intermediate ring and at least one of the output shaft and the input shaft is slideable in the axial direction relative to the first of the second gearwheel. This makes it possible to assemble the clutch in an easy way.

According to a further improvement the reverse clutch comprises positioning means for positioning the first gearwheel and the second gearwheel relative one another, which positioning means include an in axial direction adjustable bearing. In this way the meshing teeth can be adjusted and maintained in an easy way.

According to a further improvement the first coupling comprises a slide bush mounted on the output or input shaft and has teeth which can mesh with the input or the output shaft respectively by sliding in the axial direction. This means that in the situation where the direction of rotation is not being reversed a direct coupling of the shafts is possible, and no slip will occur in the clutch.

According to a further improvement the first coupling has a diameter which is smaller than the first and/or second gearwheel, and the second coupling has a diameter which is greater than the first and/or the second gearwheel. This makes it possible to make the reverse clutch shorter, which can be advantageous, for example for use in motor cars.

A further improvement is achieved in that the first gearwheel and the second gearwheel are mounted in such a way that they are slideable in the axial direction relative to each other and the intermediate ring. Accurate adjustment of the first gearwheel and the second gearwheel relative to the cylindrical pinions mounted between them is consequently simple.

According to a preferred embodiment of the invention, the intermediate ring is movable in the direction perpendicular to the axis of rotation and is centred about the axis of rotation under the influence of the tooth forces on the cylindrical pinions. This ensures that the cylindrical pinions always adjust in the best possible way relative to the first and the second gearwheel.

The invention is explained below with reference to a number of embodiments which are illustrated by means of the drawings.

BRIEF DESCRIPTION OF THE DRAWINGS

FIG. 3 shows part of a section of a reverse clutch according to a third embodiment of the invention.

FIG. 4 shows part of a section of a reverse clutch according to a fourth embodiment of the invention.

DESCRIPTION OF THE PREFERRED EMBODIMENTS

Figure 1:
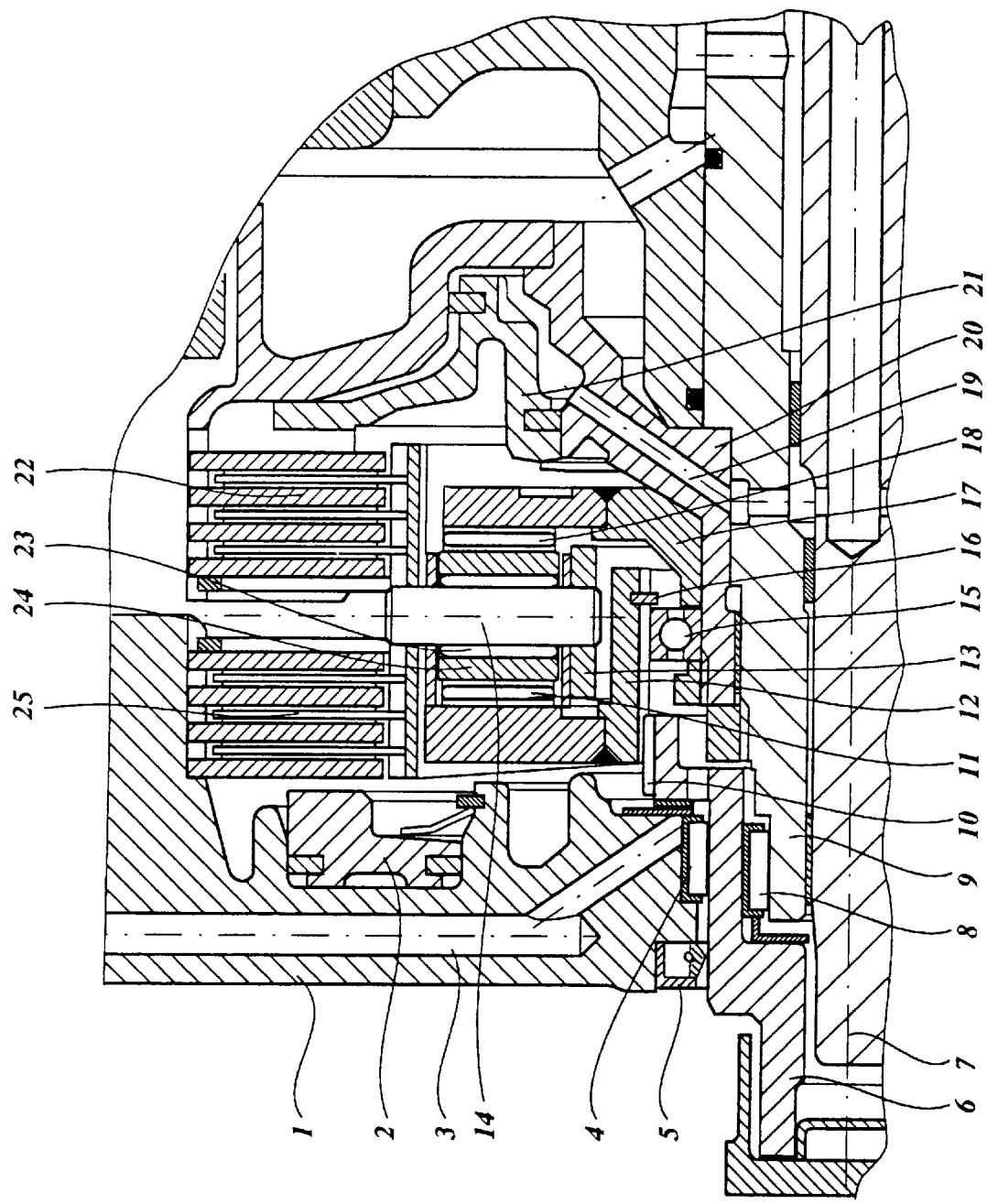
FIG. 1 shows part of a section of a reverse clutch according to a first embodiment of the invention.

In the drawings corresponding parts are always indicated as far as possible by the same reference numbers in the various figures.

FIG. 1 shows part of a section of a first embodiment of a reverse clutch according to the invention. Such reverse clutches are used, for example, as reversing devices when using a continuously variable transmission in a motor car. In this case it is necessary to be able to reverse the direction of rotation of the engine, so that the vehicle can also be reversed.

FIG. 1 shows a housing 1, in which an input shaft 6 is fixed by means of bearings 4 in such a way that it rotates about an axis of rotation 7. The input shaft 6 is rotatably fixed by means of bearings 8 on an output shaft 9, which is fixed by means of bearings (not shown) in the housing 1 in such a way that it likewise rotates about the axis of rotation 7.

A spline toothing 10 is provided on the input shaft 6, around which toothing a primary face gear 12 is fixed so that it is slidable in the direction of the axis of rotation 7. The primary face gear 12 is rotatably fixed by means of an intermediate bearing 15 on the output shaft 9, and a secondary face gear 17 and a coupling ring 20 are likewise fixed on the output shaft 9. The axial displacement under the influence of the tooth forces of the primary face gear 12 relative to the secondary face gear 17 is limited by a locking ring 16.

A face gear toothing 11 of the primary face gear 12 is in mesh with a cylindrical pinion 24, and a face gear toothing 18 of the secondary face gear 17 likewise. The cylindrical pinion 24 is rotatably fixed by means of bearings 23 on a pinion pin 14. The pinion pin 14 is fitted in an intermediate ring 13, so that the rotation of the intermediate ring 13 can be connected by means of a coupling 22 to the rotation of the coupling ring 20, and thus to the output shaft 9, and the rotation of the intermediate ring 13 relative to the housing 1 can be stopped by means of a coupling 25. Three or more cylindrical pinions are accommodated in the intermediate ring 13, so that the intermediate ring 13 is centred relative to the axis of rotation 7 by means of the toothings 11 and 18.

A pressure ring 21 can slide in the axial direction under the influence of oil supply through an oil channel 19, after which the plates of the coupling 22 are pressed in a known manner against each other, and as a result of which the rotation of the intermediate ring 13 is connected to the rotation of the output shaft 9. The rotation of the input shaft 6 and that of the output shaft 9 are now connected to each other by way of the face gear 17, the cylindrical pinions 24 and the face gear 12.

If the direction of rotation has to be reversed, the coupling 22 is released by removing the oil pressure in channel 19, after which a spring (not specified any further) pushes back the pressure ring 21 against the coupling ring 20. A pressure ring 2 is then pressed in a manner comparable to that described above against the plates of the coupling 25, with the result that the intermediate ring 13 comes to a standstill in the housing. The direction of rotation of the primary face gear 12 is now opposite to that of the secondary face gear 17, with the result that the input shaft 6 and the output shaft 9 also rotate in opposite directions.

In order to permit assembly of the reverse clutch in the direction of the shaft in an undivided housing, the various parts should be mounted so that they are slidable in the direction of the shaft. First of all, the input shaft 6 and the pressure ring 2 are mounted in the housing 1. Inter alia, the intermediate ring 13 with couplings 22 and 25, and the primary face gear 12 and the secondary face gear 17, which are positioned and adjusted relative to each other, are mounted on the output shaft 9. This assembly is then slid into the housing 1, which is possible through the fact that the various bearings are in the form of roller bearings and the fact that the plates of the coupling 25 can slide into the housing.

In order to provide the various toothings, bearings and coupling plates with sufficient oil, an oil channel 3 is fitted, oil channels likewise being provided at various other points to ensure an adequate oil supply. An oil seal 5 is fitted between the housing 1 and the input shaft 6. Various other design details are also shown in the drawing, which details are a matter of course for a technical draughtsman, and will therefore not be elaborated any further here.

Figure 2:
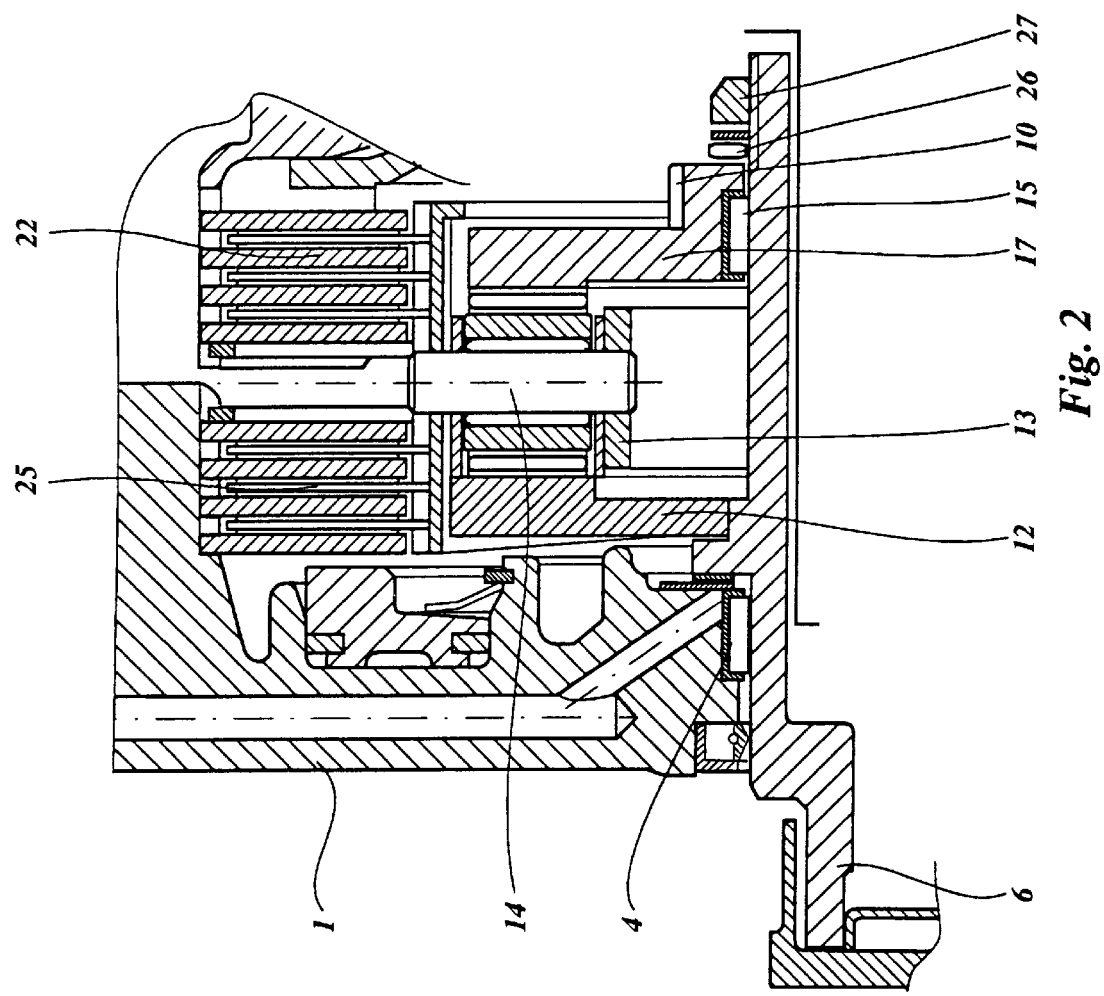
FIG. 2 shows part of a section of a reverse clutch according to a second embodiment of the invention.

FIG. 2 shows an embodiment which is comparable to the embodiment of FIG. 1, in which the primary face gear 12 and the secondary face gear 17 are more easily adjustable relative to each other, owing to the fact that the distance between the face gears can be adjusted by means of an adjusting nut 27 mounted on the input shaft 6, the secondary face gear 17 being held in position by a thrust bearing 26 placed between the face gear 17 and the adjusting nut 27. The face gears and the couplings are assembled and adjusted on the input shaft 6 and mounted in the housing 1, after which the output shaft 9 is mounted in a manner not shown. The rotation of the output shaft 9 is brought about by coupling with the secondary face gear 17 by way of the spline toothing 10.

Figure 3:
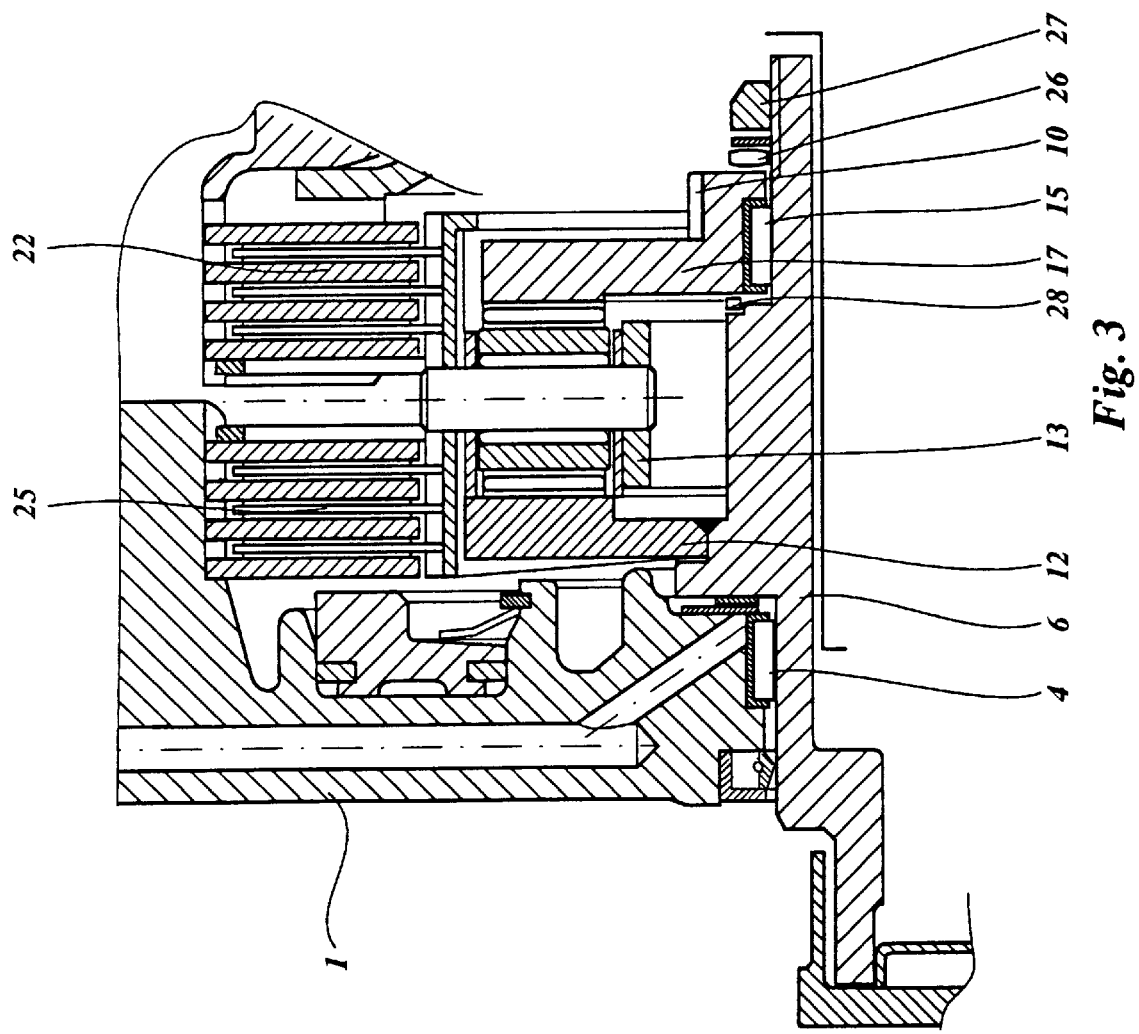
FIG. 3 shows part of a section of a reverse clutch.

FIG. 3 shows an embodiment in which the distance between the primary face gear 12 and the secondary face gear 17 is set to a maximum value with the adjusting nut 27, and in which the minimum distance between the face gears is determined by a sliding ring 28. This ensures that there is always a slight tooth play between the toothings.

FIG. 4 shows an embodiment in which in the situation where the direction of rotation of the input shaft 6 and the output shaft 9 (not shown) is the same the toothings of the face gears 12 and 17 are not placed under load, owing to the fact that the input shaft 6 is coupled directly to the secondary face gear 17. To this end, a slide bush 30, which rotates with the input shaft 6 by means of the spline toothing 31, is fitted around the input shaft 6. The slide bush 30 can be pushed in the direction of the secondary face gear 17 by a pressure ring 29, as a result of which a coupling toothing 32 meshes. The pressure ring 29 acts in a known manner on oil pressure, and when the oil pressure is removed the coupling toothing 32 is uncoupled through the fact that the slide bush 30 slides away, partly under the influence of a spring of the secondary face gear.

The coupling toothing 32 can take a high torque and can consequently have a relatively small diameter. This makes it possible to fit the one coupling inside the face gear toothing and the other coupling outside it. A shorter fitting length can be achieved as a result, which can be a great advantage particularly for use in motor cars.

It is also possible to use a synchronization ring (not shown) in the case of the coupling toothing 32, by means of which ring the speed of rotation of the coupling halves to be coupled is synchronized, so that they slide into each other without jolting.

A coupling comparable to the slide bush 30 and coupling toothing 32 can, of course, also be used in the case of the coupling 25, so that there too a smaller diameter may be selected if desired, with the result that the reverse clutch can be made more compact.

In the situation where one or both couplings 22 and 25 are in the form of a switch toothing with a slide bush, a coupling toothing and possibly a synchronization ring, a coupling is preferably placed between the input shaft and the engine. If the reverse clutch is being used for driving a motor car, said coupling can be in the form of, for example, a hydraulic coupling or a torque converter.

The invention can be varied in various ways, for example by not making the number of teeth of the primary and the secondary face gear exactly the same, so that, for example, vibrations can be reduced.

It is also possible for the axis of rotation of the cylindrical pinions not to be at right angles to the axis of rotation 7 of the input and/or output shaft, which makes the face gears easier to produce with a hobbing cutter. It is then in fact possible to avoid cutting through the shaft with the cutter.

What is claimed is:

1. A reverse clutch comprising an input shaft, an output shaft and an intermediate ring which are rotatable about a common axis of rotation in a housing and relative to each other, and further comprising a first gearwheel rotatably coupled to the input shaft, a second gearwheel rotatably coupled to the output shaft, a first coupling for rotatably coupling the input and the output shaft, a second coupling for rotatably coupling the intermediate ring and the housing and cylindrical pinions which are mounted in the intermediate ring between and in mesh with the first and the second gearwheels, wherein the axis of rotation of the cylindrical pinions is substantially perpendicular to the common axis of rotation.

2. The reverse clutch of claim 1, wherein the housing is slideable in axial direction relative to the intermediate ring and at least one of the output shaft and the input shaft is slideable in the axial direction relative to the first or the second gearwheel.

3. The reverse clutch of claim 1, comprising positioning means for positioning the first gearwheel and the second gearwheel relative one another, which positioning means include an in axial direction adjustable bearing.

4. The reverse clutch of claim 1, wherein the first coupling comprises a slide bush mounted on the output or input shaft and having teeth which can mesh with the input or the output shaft respectively by sliding in the axial direction.

5. The reverse clutch of claim 1, wherein the first coupling has a diameter which is smaller than the first and/or the second gearwheel, and the second coupling has a diameter which is greater than the first and/or the second gearwheel.

6. The reverse clutch of claim 1, wherein the first gearwheel and the second gearwheel are mounted in such a way that they are slideable in the axial direction relative to each other and the intermediate ring (13).

7. The reverse clutch of claim 6, wherein the intermediate ring is movable in the direction perpendicular to the axis of rotation and is centred about the axis of rotation under the influence of the tooth forces on the cylindrical pinions.

* * * * *